L. NEUMANN.
PYROPHORIC IGNITER.
APPLICATION FILED DEC. 19, 1910.
1,085,991.
Patented Feb. 3, 1914.
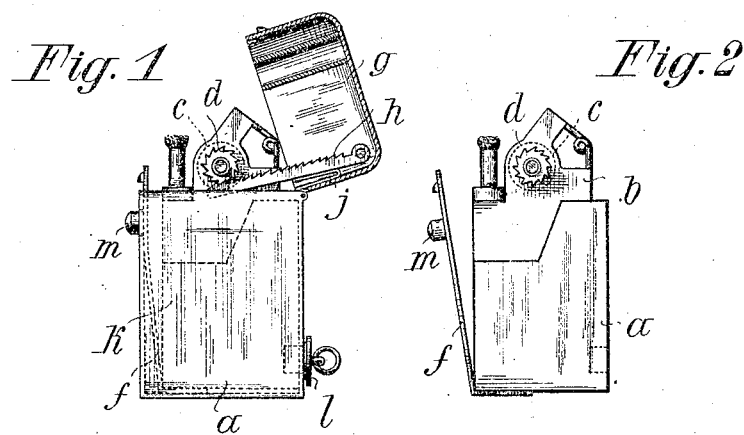

UNITED STATES PATENT OFFICE.

LUDWIG NEUMANN, OF VIENNA, AUSTRIA-HUNGARY, ASSIGNOR, BY MESNE ASSIGNMENTS, TO AMERICAN BUTTON COMPANY, OF NEWARK, NEW JERSEY, A CORPORATION OF NEW JERSEY.

PYROPHORIC IGNITER.

1,085,991.     Specification of Letters Patent.     Patented Feb. 3, 1914.

Application filed December 19, 1910. Serial No. 598,105.

*To all whom it may concern:*

Be it known that I, LUDWIG NEUMANN, engineer, a subject of the Emperor of Austria-Hungary, residing at No. 36 Bergsteiggasse, in the city of Vienna, Empire of Austria-Hungary, have invented certain new and useful Improvements in Pyrophoric Igniters, of which the following is a specification.

The ordinary pocket lighters or ignition appliances with spring lids have the disadvantage that the case of the lights is firmly connected with the internal parts such, for instance, as the benzin container, friction wheel and the means for operating the friction wheel, by soldering, riveting or the like. This circumstance necessitates complicated fitting and also the lighting appliance cannot be completely put together as a whole before being ground and nickeled, as various parts such as the wick, wadding, friction wheel and ignition pin must not be exposed to the action of the galvanic bath. For this reason various operations can only be done after the surface of the case of the appliance has been finished, whereby the surfaces are as a rule damaged and the articles much diminished in value. The arrangement for operating the friction wheel is also more or less complicated in the types of appliances hitherto employed.

Now this invention has for its object to avoid the disadvantages hereinbefore set forth, by the case being made independently, and all the parts necessary for the lighting (such as the friction wheel, ignition pin, ratchet wheel and the like) being connected with the benzin container, which forms an independent part. The operation of the friction wheel is effected by means of a springy rack bar connected with the lid, and engaging a ratchet wheel firmly connected with the friction wheel.

One form of construction of the invention is shown as an example in the accompanying drawings, in which:—

Figure 1 is a side view of the finished lighting appliance with the lid open; and Fig. 2 is a side view of the appliances without the case.

A supporting frame *b* is fixed on the benzin container *a*, in which frame *b* the friction wheel *c* and also a ratchet wheel *d* firmly connected with it, are arranged. A snap spring *f* is fixed on one side of the benzin container *a*. A rackbar *h* is pivotally mounted, by means of a pin *i*, in the lid *g* of the case, and is under the action of a spring *j*, which holds the rackbar in engagement with the ratchet wheel *d*, the teeth of which slope like those of a saw.

The lighting appliance which contains the wick, wadding, friction wheel, ignition pin and so-forth, and which is constructed complete together with the benzin container so as to form an independent part, is simply inserted in the case *k* and fastened therein by means of the ordinary filling screw *l* and a stud *m* on the snap spring *f* projecting through an aperture in the case *k*. On the insertion of the lighting appliance in the case *k*, the spring rackbar *h* comes into engagement with the ratchet wheel *d*, whereupon the appliance is ready for use. On the closing of the lid *g* the springy rackbar *h* slips along the teeth of the ratchet wheel *d* without actuating it, while on the opening of the lid the ratchet wheel *d* and with it the friction wheel *c* is set in motion.

I declare that what I claim is:—

1. In a pyrophoric pocket lighting appliance, the combination of a casing, a hinged cover for the casing, a benzin container removably mounted within the casing and provided with a wick, a wheel rotatably mounted on the container, a ratchet wheel connected to the friction wheel, means for holding a pyrophoric substance in contact with the friction wheel, and a rack bar pivotally connected to said cover for rotating the ratchet wheel only when the cover is opening to throw sparks on the wick, substantially as described.

2. In a pyrophoric pocket lighting appliance, the combination of a casing, a hinged cover for the casing, a benzin container removably mounted within the casing, a wick projecting from the container, a friction wheel rotatably mounted on the container, a ratchet wheel connected to the friction wheel, means carried by the container for holding a pyrophoric substance in engagement with the friction wheel, a rack bar pivotally connected to the cover, and a spring attached to the cover for pressing the rack bar in engagement with the ratchet wheel during the opening of the cover, substantially as described.

3. In a pyrophoric pocket lighting appliance, the combination of a casing provided with an opening near its top, a hinged cover for the casing, a benzin container adapted to fit within the casing, a snap spring for holding the cover in closed position, a wick projecting from the container, a friction wheel rotatably mounted on the container, a ratchet wheel connected to the friction wheel, means carried by the container for holding a pyrophoric substance in engagement with the friction wheel, a rack bar pivotally connected to the cover, a spring interposed between the cover and the rack bar for pressing the latter in operative engagement with the ratchet wheel during the opening of the cover, substantially as described.

In testimony whereof I have affixed my signature in presence of two witnesses.

LUDWIG NEUMANN.

Witnesses:
GUSTAV WOLF,
AUGUST FUGGER.